Aug. 8, 1950     H. FOX     2,518,133
CONTINUOUS PRECIPITATION OF CELLULOSE DERIVATIVES
Filed Dec. 26, 1947
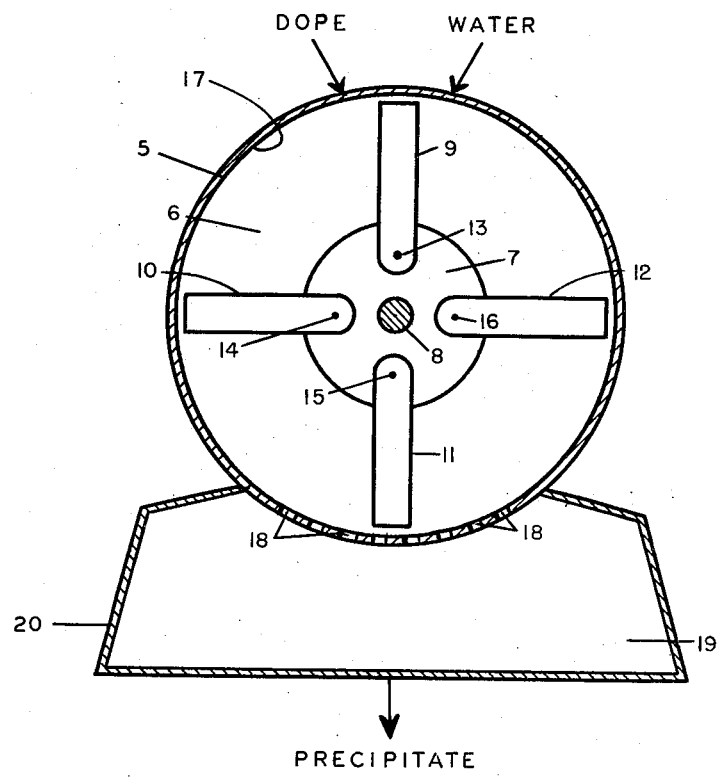
HERMAN FOX
INVENTOR.
BY Ernest G. Peterson
AGENT Patented Aug. 8, 1950

2,518,133

UNITED STATES PATENT OFFICE 2,518,133

CONTINUOUS PRECIPITATION OF CELLULOSE DERIVATIVES

Herman Fox, Highland Park, N. J., assignor to Hercules Powder Company, Wilmington, Del., a corporation of Delaware Application December 26, 1947, Serial No. 794,036

6 Claims. (Cl. 260—230)

This invention relates to the preparation of organic derivatives of cellulose and more particularly to a method and apparatus for continuously precipitating organic esters of cellulose from a solution in which they are formed.

In the manufacture of organic esters of cellulose, such as cellulose acetate, cellulose is acetylated by means of acetic anhydride and a catalyst in the presence of large amounts of acetic acid. As the reaction proceeds the cellulose acetate formed is dissolved by the acetic acid to form a highly viscous solution.

At the completion of the acetylation reaction the viscous solution of cellulose acetate is usually subjected to hydrolysis followed by precipitation and washing to recover the cellulose acetate. Precipitation may be accomplished in a number of ways. According to one method precipitation is effected by slowly adding water to the so-called acid dope in the hydrolyzer and agitating the mass until precipitation is complete. The precipitate is then washed and discharged from the hydrolyzer under pressure to receive further treatments such as grinding in a mill and other purification treatments.

This method, however, is subject to a number of disadvantages. One of the most serious is that it ties up the hydrolyzer during the precipitating step and thus slows up the whole operation to that extent. Furthermore, agitation of the heavy precipitate requires rugged equipment and a big power input which would not be necessary to take care of the normal agitation load of the hydrolyzer. Other disadvantages are the inconveniences and difficulties encountered in removing the precipitate from the hydrolyzer and the formation of acetate fines which result in considerable losses in yield.

Another method of precipitation involves passing the acid dope into a bath of water or very dilute acid. Here again it is difficult, if not impossible, to obtain a uniformly sized precipitate even with ordinary means of agitation. Thus, the acetate fines which are formed are a source of loss during washing, and the larger particles require grinding to adapt them for further processing. Furthermore, the nonuniformity in particle size increases the difficulties of washing and results in a further increase in cost of the process.

It is therefore an object of the present invention to provide a method and apparatus for the continuous precipitation of cellulose acetate and other organic esters which will overcome the disadvantages of prior art methods and devices.

It is a further object of the invention to provide a method and apparatus for the continuous precipitation of organic esters of cellulose by which the size of the precipitate may be readily controlled and a uniformly sized precipitate, free of fines and large particles, obtained.

It is a still further object of the invention to produce a precipitate of cellulose acetate which has exceptionally good washing qualities, improved stability to heat, and increased susceptibility to and ease of purification.

These and other objects will become more apparent as the description proceeds.

It has now been discovered, in accordance with the present invention, that organic esters of cellulose and particularly cellulose acetate, may be precipitated from their solutions or acid dopes in an improved manner by a process which involves introducing the solution or acid dope into a device of the hammer mill type, introducing a stream of aqueous liquid or dilute acid into the device so as to contact the acid dope and initiate precipitation of the cellulose acetate, agitating and mixing the aqueous liquid or dilute acid and acid dope to completely precipitate the cellulose acetate, grinding and milling the precipitated cellulose acetate to a uniform particle size, washing the precipitated cellulose acetate from the device through a plurality of openings of a predetermined uniform size to control the particle size of the precipitate discharged, and recovering and washing the precipitate. By the method of this invention it is possible to continuously produce a cellulose organic ester precipitate which is uniform in size, free of fines and large particles, washes exceptionally well, has good stability to heat and may be more readily purified than known precipitates of this character. In addition the method of this invention provides a continuous process of precipitation which permits considerable reduction in operating cycles for the manufacture of cellulose acetate and other organic esters of cellulose and thus results in great savings of time, labor and money.

The method, according to the present invention, may be carried out in any suitable form of apparatus such as, for example, hammer mill of either the fixed hammer or the swing hammer type. In the former the rotating hammers are rigidly fastened to the shaft; in the latter the hammers are pivotally mounted so that they may swing and are held out by centrifugal force when the mill is operating. Alternatively, various forms of crushers may be used as long as they are designed and constructed to carry out the several functions and the steps of the process herein set forth.

For purposes of illustration a device of the swing hammer mill type has been selected and is shown diagrammatically in the drawing. This is representative of one type of apparatus which has been found particularly suitable for the purpose.

Referring more particularly to the drawing the numeral 5 designates a closed vessel of any suitable shape and size forming therein a precipitating and grinding chamber 6. Within the precipitating and grinding chamber 6 is a disc 7 mounted on a rotatable shaft 8. Only one disc 7 is shown for purposes of illustration. However, it will be understood that any suitable number of these discs may be mounted on the shaft 8 in axially spaced relationship. The disc 7 carries a plurality of radially extending arms 9, 10, 11 and 12 pivotally mounted thereon by the pins 13, 14, 15 and 16. These arms extend outwardly to a point adjacent the inner surface 17 of the precipitating vessel 5, the clearance between the ends of the arms and the surface 17 being adjusted to grind the precipitated particles to a predetermined particle size. If desired a corrugated crushing plate may be installed in the upper portion of the chamber 6 to assist in the grinding and crushing of the precipitate.

The bottom portion of the vessel 5 is provided with a plurality of spaced perforations 18 of a predetermined uniform size for controlling the particle size of the precipitate discharged therethrough from the chamber 6. The perforations 18 communicate with a receiving chamber 19 formed by a container 20 from which the precipitate is discharged, as indicated by the arrow, for further treatment.

In the operation of the above-described device acid dope from an acetylator or hydrolyzer (not shown) is introduced into the chamber 6 in controlled amounts. Suitable means for doing this may comprises a valve-controlled pipe or conduit provided at its end with a distributor so that the dope passes therefrom and into the precipitating chamber in the form of a ribbon. Various distributors or dies may be utilized for convenient handling of the dope. An aqueous liquid such as water or dilute acid is likewise introduced into the chamber 6 in controlled amounts. As the acid dope enters the chamber and mixes with the aqueous liquid, precipitation of the cellulose acetate or other organic ester of cellulose is initiated. Further precipitation takes place as the aqueous liquid and acid dope are thoroughly mixed and agitated by the revolving hammers 9, 10, 11 and 12.

As the precipitated particles work outwardly toward the inner surface 17 of the vessel 5 they are caught by the ends of the hammers 9, 10, 11 and 12 and milled or ground between the hammer ends and the surface 17. This milling or grinding action reduces the precipitated particles to a size such that they may then pass through the perforations 18 to the chamber 19 from which they are discharged for further treatment. By correlating the clearance between the ends of the hammers and the inner surface 17 with the size of the perforations 18, the milling and grinding action is thus effective to produce particles of uniform size which will pass through the perforations. It will be apparent that the particle size of the precipitate may be closely controlled and a uniform product obtained. Smaller or larger particles may be obtained by increasing or decreasing the size of the openings or perforations 18 and by a corresponding decrease or increase in the clearance between the ends of the hammers and the inner surface 17.

As the precipitated particles are reduced to the proper particle size, the liquid which is continuously entering and leaving the chamber 6 washes or flushes them through the perforations 18 and into the chamber 19 from which they pass for further treatment.

In order to further illustrate the invention the following examples of specific embodiments thereof are given.

Example 1

A secondary cellulose acetate dope obtained by acetylating and hydrolyzing in accordance with Example 2 of Hofmann Patent No. 2,126,190 was continuously precipitated in the following manner. The hydrolyzed dope containing about 25% cellulose acetate by weight was passed through a valve-controlled pipe to a continuous precipitator of the type shown in the drawing. A distributor which allowed the dope to emerge as a ribbon was attached to the end of the pipe and hung directly over the precipitator. When the dope started to flow into the precipitator, water was turned on and precipitation proceeded. A precipitation rate of 85 pounds of cellulose acetate per minute was obtained and the water was adjusted to precipitate the cellulose acetate and produce a spent acid of about 25% acetic acid. However, this may be varied to suit the individual acid recovery system. Weak acetic acid may also be used to build up the acid strength when desirable.

The precipitate had a fibrous structure and was very uniform in particle size. It was washed acid free and then given further purification treatments in accordance with usual practice. Because of the fibrous nature of the particles, the washing and purification treatments were very efficient and allowed few losses to the wash water, thus improving the total yield. The more efficient washing also produced a product with excellent stability to heat which is a requirement of high-quality cellulose acetate.

Example 2

A hydrolyzed cellulose propionate dope made in accordance with Example 3 of Hofmann Patent No. 2,126,190 was continuously precipitated in a similar manner except that the water feed was controlled to give a spent acid acidity of about 40% propionic acid. The characteristics of the precipitate were excellent for washing and purification purposes, although it was somewhat less fibrous than the cellulose acetate previously described.

Acid dopes containing from about 9% to about 35% organic ester of cellulose by weight, based on the weight of the solution, have been satisfactorily precipitated by the method and apparatus of the present invention. However, it is preferred to utilize a dope containing from about 20% to about 30% organic ester in the case of cellulose acetate and from about 15% to about 20% organic ester in the case of cellulose propionate.

When the acid dope, containing the organic ester of cellulose in solution, is ready for precipitation it is run into a precipitating device of the type shown in the drawing in controlled amounts according to the capacity of the device. Water or weak acid is likewise run into the device in controlled amounts depending upon the amount of dope feed. The amount of water or dilute acid used should be at least sufficient to effect precipitation of the cellulose organic ester. In the case of cellulose acetate dopes this will usually be an amount of water or weak acid sufficient to reduce the acidity of the dope to below about 40% acidity. In the case of cellulose propionate sufficient water or weak acid is utilized to reduce the acidity below about 50% acidity. Somewhat greater amounts may be used, particularly where it is desirable to maintain a spent acid strength which will facilitate recovery of the acid. However, large excesses should be avoided. The feed of acid dope and water or dilute acid may be controlled by any suitable type of measuring valve.

The acid dope and aqueous liquid are thoroughly mixed and agitated in the precipitator to effect a rapid and uniform precipitation of the cellulose organic ester which is then milled and ground to a predetermined particle size and washed from the precipitator through perforations of a predetermined uniform size.

Although the method and apparatus of the present invention are particularly suitable for the precipitation of cellulose acetate, they may be used with considerable advantage to precipitate other organic esters of cellulose such as cellulose propionate, cellulose acetate butyrate, cellulose acetate propionate, etc., which are more impervious to water and therefore more difficult to wash. The precipitation treatment may be given following a hydrolysis treatment or immediately following the completion of the acetylation reaction. The invention is also applicable to the treatment of previously manufactured organic esters of cellulose which may be dissolved in a suitable solvent and then precipitated.

The combined treatments in accordance with the present invention produce a highly uniform precipitate somewhat more fibrous in form than that usually obtained and which is characterized by substantial freedom from fines, improved washing properties and stability to heat and increased ease of purification. This is accomplished in a simple and highly effective manner by utilizing a single unitary device which continuously precipitates, reduces the particle size and washes the particles through a screen to a receiver. The invention is particularly advantageous in the precipitation of cellulose acetate from acid dopes and results in considerable shortening of operating cycles with consequent economies in the cost of manufacture.

It is to be understood that the foregoing detailed description is merely given by way of illustration and that many variations may be made therein without departing from the scope of the invention. Thus, for example, if heating is desired a heating fluid may be circulated through a suitable heat exchange device such as a surrounding jacket or internal pipes or coils. Likewise, instead of providing the perforations 18 in the bottom of the vessel 5 it is possible to utilize a cylindrical perforated screen or plate positioned within the vessel 5 and spaced inwardly from the interior wall 17 to provide a receiving and discharge passage for the liquid and precipitate and spaced outwardly from the ends of the rotating arms 9, 10, 11 and 12 just sufficient to provide the desired grinding action. These and other modifications will be apparent to those skilled in the art.

What I claim and desire to protect by Letters Patent is:

1. A single-stage continuous process for obtaining particles of an organic ester of cellulose of uniform predetermined size from a solution of said ester in a water-miscible solvent which comprises continuously introducing the solution of the ester into a precipitating chamber, simultaneously and continuously introducing into the precipitating chamber an aqueous liquid of the group consisting of water and dilute aqueous acid mixtures in an amount sufficient to cause substantially complete precipitation of the cellulose ester from its solution upon contacting and mixing the two, simultaneously and continuously vigorously agitating the solution and aqueous liquid to effect intimate mixing of the two and precipitation of the cellulose ester, simultaneously and continuously milling and grinding the precipitate of cellulose ester in the precipitating chamber as it is formed to a predetermined uniform particle size, and simultaneously and continuously discharging the milled and ground precipitate from the precipitating chamber through restricted uniform openings of predetermined size.

2. The method according to claim 1 in which the solution of an organic ester of cellulose is a cellulose acetate acid dope formed by the acetylation of cellulose.

3. The method according to claim 2 in which the ground and milled precipitate of cellulose acetate is discharged from the precipitation chamber by washing it through restricted openings of predetermined size to control the particle size of the precipitate.

4. A single-stage continuous process for obtaining particles of an organic ester of cellulose of uniform predetermined size from an acid dope containing from about 9% to about 35% by weight of the organic ester of cellulose in solution which comprises continuously introducing the acid dope into a precipitating chamber in controlled amounts, simultaneously and continuously introducing into the precipitating chamber an aqueous liquid of the group consisting of water and dilute aqueous acid mixtures in controlled amounts sufficient to reduce the acidity of the acid dope below about 50% acidity and to cause substantially complete precipitation of the cellulose ester from the acid dope upon contacting and mixing the two, simultaneously and continuously vigorously agitating the acid dope and aqueous liquid to effect intimate mixing of the two and precipitation of the cellulose ester, simultaneously and continuously passing the formed precipitate outwardly in the precipitating chamber to a grinding area, simultaneously and continuously grinding the precipitate in the grinding area to reduce it to uniformly-sized particles, simultaneously and continuously washing the precipitate from the precipitating chamber through restricted openings of predetermined uniform size, and recovering and washing the particles.

5. The method according to claim 4 in which the organic ester of cellulose is cellulose propionate.

6. The method according to claim 4 in which the organic ester of cellulose is cellulose acetate and the aqueous liquid is added in an amount sufficient to reduce the acidity of the acid dope below about 40% acidity.

HERMAN FOX.

REFERENCES CITED

The following references are of record in the file of this patent:

UNITED STATES PATENTS

| Number | Name | Date |
|---|---|---|
| 1,785,840 | Munroe | Dec. 23, 1930 |
| 2,208,637 | Jones et al. | July 23, 1940 |
| 2,239,782 | Haney | Apr. 29, 1941 |
| 2,271,074 | Hofmann et al. | Jan. 27, 1942 |